(12) United States Patent
Kobayashi et al.

(10) Patent No.: US 12,376,707 B1
(45) Date of Patent: Aug. 5, 2025

(54) SAWTOOTH WAVE IMPELLER TUMBLER

(71) Applicants: Jordan Kobayashi, Kingston (CA); Morgan Pittfield, Kingston (CA)

(72) Inventors: Jordan Kobayashi, Kingston (CA); Morgan Pittfield, Kingston (CA)

( * ) Notice: Subject to any disclaimer, the term of this patent is extended or adjusted under 35 U.S.C. 154(b) by 0 days.

(21) Appl. No.: 19/055,486

(22) Filed: Feb. 17, 2025

(51) Int. Cl.
*A47J 43/27* (2006.01)
*A47G 19/22* (2006.01)
*B01F 33/501* (2022.01)
*B01F 35/512* (2022.01)
*B01F 101/14* (2022.01)

(52) U.S. Cl.
CPC .......... *A47J 43/27* (2013.01); *A47G 19/2272* (2013.01); *B01F 33/50111* (2022.01); *B01F 35/512* (2022.01); *B01F 2101/14* (2022.01)

(58) Field of Classification Search
CPC ............................ B01F 33/50111; A47J 43/27
USPC .......................................... 366/130; 220/568
See application file for complete search history.

(56) References Cited

U.S. PATENT DOCUMENTS

| | | | | |
|---|---|---|---|---|
| 1,713,979 A * | 5/1929 | Redmond | ............... | D06F 43/00 68/213 |
| 2,433,248 A * | 12/1947 | Sweier | ................. | F25D 31/006 366/147 |
| 8,926,165 B2 * | 1/2015 | Ohtsuka | ............... | B01F 35/531 366/256 |
| 2005/0048169 A1 * | 3/2005 | Delouis | ................. | B65D 23/04 426/106 |
| 2011/0026357 A1 * | 2/2011 | Ohtsuka | ............... | B01F 35/531 366/118 |
| 2014/0192610 A1 * | 7/2014 | Holmes | ................... | A47J 43/27 220/288 |

* cited by examiner

*Primary Examiner* — David L Sorkin
(74) *Attorney, Agent, or Firm* — Pharar Patents & Intellectual Property; Andrew A. Pharar

(57) ABSTRACT

The sawtooth wave impeller tumbler may overcome the limitations of conventional mixers. An ideal solution would combine efficient mixing with ease of operation and cleaning, all while maintaining a high degree of precision and versatility in a wide range of applications. The device may comprise a pattern of internal sawtooth waves that provide for efficient and complete mixing of a solute and a solvent. In one embodiment the sawtooth wave impeller tumbler may comprise a tumbler for use by an individual user. The device may further comprise a plurality of components to improve the case of use and the functionality of the device such as, for example, a handle, a carabiner clip, a mouth cap, a removeable lid, or a support base.

9 Claims, 13 Drawing Sheets

| Impeller Trial 1 | Initial | Top | Middle | Bottom | 15 Mins | Total Row | Row Score % | Total Foam + Visual | Total Mixture | Foam % of Avg | Mixture vs Avg |
|---|---|---|---|---|---|---|---|---|---|---|---|
| Visual Consistency | 4 | 4 | 4 | 3 | 4 | 19 | 0.76 | 112 | 52 | 1.03226 | 1.0297 |
| Texture (Smoothness) | 4 | 4 | 4 | 3 | 5 | 20 | 0.8 | | | | |
| Foam and Bubbles | 4 | 4 | 4 | 4 | 4 | 20 | 0.8 | | | | |
| Residue on Bottle Wall | 4 | | | | 3 | 7 | 0.7 | | | | |
| Layering | 4 | 4 | 4 | 4 | 4 | 20 | 0.8 | | | | |
| Bubble Size and Spread | 4 | 4 | 4 | 4 | 4 | 20 | 0.8 | | | | |
| Ease of Pouring | 5 | | | | 5 | 10 | 1 | | | | |
| Unmixed Residue | 3 | | | | 3 | 6 | 0.6 | | | | |
| Aroma | 5 | 5 | 5 | 5 | 5 | 25 | 2 | | | | |

FIG. 11

| Helimix Trial 1 | Initial | Top | Middle | Bottom | 15 Mins | Total Row | Row Score % | Total Foam + Visual | Total Mixture | Foam % of Avg | Mixture vs Avg |
|---|---|---|---|---|---|---|---|---|---|---|---|
| Visual Consistency | 4 | 4 | 4 | 4 | 4 | 20 | 0.8 | 97 | 46 | 0.89401 | 0.91089 |
| Texture (Smoothness) | 3 | 4 | 4 | 4 | 3 | 18 | 0.72 | | | | |
| Foam and Bubbles | 3 | 3 | 4 | 4 | 2 | 16 | 0.64 | | | | |
| Residue on Bottle Wall | 2 | | | | 2 | 4 | 0.4 | | | | |
| Layering | 4 | 4 | 4 | 4 | 3 | 19 | 0.76 | | | | |
| Bubble Size and Spread | 3 | 3 | 3 | 4 | 3 | 16 | 0.64 | | | | |
| Ease of Pouring | 5 | | | | 5 | 10 | 1 | | | | |
| Unmixed Residue | 2 | | | | 2 | 4 | 0.4 | | | | |
| Aroma | 5 | 5 | 5 | 5 | 5 | 25 | 1 | | | | |

FIG. 12

| Blender Trial 1 | Initial | Top | Middle | Bottom | 15 Mins | Total Row | Row Score % | Total Foam + Visual | Total Mixture | Foam % of Avg | Mixture vs Avg |
|---|---|---|---|---|---|---|---|---|---|---|---|
| Visual Consistency | 4 | 4 | 4 | 4 | 5 | 21 | 0.84 | 122 | 58 | 1.12442 | 1.14851 |
| Texture (Smoothness) | 4 | 4 | 4 | 4 | 5 | 21 | 0.84 | | | | |
| Foam and Bubbles | 3 | 4 | 5 | 5 | 4 | 21 | 0.84 | | | | |
| Residue on Bottle Wall | 5 | | | | 5 | 10 | 1 | | | | |
| Layering | 4 | 4 | 4 | 4 | 5 | 21 | 0.84 | | | | |
| Bubble Size and Spread | 4 | 4 | 5 | 5 | 4 | 22 | 0.88 | | | | |
| Ease of Pouring | 5 | | | | 5 | 10 | 1 | | | | |
| Unmixed Residue | 3 | | | | 3 | 6 | 0.6 | | | | |
| Aroma | 5 | 5 | 5 | 5 | 5 | 25 | 1 | | | | |

FIG. 13

| Shakesphere Trial 1 | Initial | Top | Middle | Bottom | 15 Mins | Total Row | Row Score % | Total Foam + Visual | Total Mixture | Foam % of Avg | Mixture vs Avg |
|---|---|---|---|---|---|---|---|---|---|---|---|
| Visual Consistency | 3 | 3 | 3 | 3 | 4 | 16 | 0.64 | 103 | 46 | 0.94931 | 0.91089 |
| Texture (Smoothness) | 4 | 3 | 4 | 3 | 4 | 18 | 0.72 | | | | |
| Foam and Bubbles | 4 | 4 | 5 | 5 | 4 | 22 | 0.88 | | | | |
| Residue on Bottle Wall | 3 | | | | 3 | 6 | 0.6 | | | | |
| Layering | 3 | 3 | 3 | 2 | 4 | 15 | 0.6 | | | | |
| Bubble Size and Spread | 4 | 4 | 4 | 4 | 4 | 20 | 0.8 | | | | |
| Ease of Pouring | 5 | | | | 4 | 9 | 0.9 | | | | |
| Unmixed Residue | 3 | | | | 3 | 6 | 0.6 | | | | |
| Aroma | 5 | 5 | 5 | 5 | 5 | 25 | 1 | | | | |

FIG. 14

| Averages Trial 1 | Initial | Top | Middle | Bottom | 15 Mins | Total Row | Row Score % | Total Foam + Visual | Total Mixture |
|---|---|---|---|---|---|---|---|---|---|
| Visual Consistency | 3.75 | 3.8 | 3.75 | 3.5 | 4.25 | 19 | 0.76 | 108.5 | 50.5 |
| Texture (Smoothness) | 3.75 | 3.8 | 4 | 3.5 | 4.25 | 19.25 | 0.77 | | |
| Foam and Bubbles | 3.5 | 3.8 | 4.5 | 4.5 | 3.5 | 19.75 | 0.79 | | |
| Residue on Bottle Wall | 3.5 | | | | 3.25 | 6.75 | 0.675 | | |
| Layering | 3.75 | 3.8 | 3.75 | 3.5 | 4 | 18.75 | 0.75 | | |
| Bubble Size and Spread | 3.75 | 3.8 | 4 | 4.25 | 3.75 | 19.5 | 0.78 | | |
| Ease of Pouring | 5 | | | | 4.75 | 9.75 | 0.975 | | |
| Unmixed Residue | 2.75 | | | | 2.75 | 5.5 | 0.55 | | |
| Aroma | 5 | 5 | 5 | 5 | 5 | 25 | 1 | | |

FIG. 15

| Impeller Trial 2 | Initial | Top | Middle | Bottom | 15 Mins | Total Row | Row Score % | Total Foam + Visual | Total Mixture | Foam % of Avg | Mixture vs Avg |
|---|---|---|---|---|---|---|---|---|---|---|---|
| Visual Consistency | 5 | 5 | 5 | 5 | 5 | 25 | 1 | 137 | 70 | 1.06408 | 1.11554 |
| Texture (Smoothness) | 5 | 5 | 5 | 5 | 5 | 25 | 1 | | | | |
| Foam and Bubbles | 4 | 5 | | 5 | 5 | 19 | 0.76 | | | | |
| Residue on Bottle Wall | 5 | | | | 5 | 10 | 1 | | | | |
| Layering | 4 | 5 | 5 | 5 | 5 | 24 | 0.96 | | | | |
| Bubble Size and Spread | 4 | 5 | 5 | 5 | 5 | 24 | 0.96 | | | | |
| Ease of Pouring | 5 | | | | 5 | 10 | 1 | | | | |
| Unmixed Residue | 5 | | | | 5 | 10 | 1 | | | | |
| Aroma | 5 | 5 | 5 | 5 | 5 | 25 | 1 | | | | |

FIG. 16

| Helimix Trial 2 | Initial | Top | Middle | Bottom | 15 Mins | Total Row | Row Score % | Total Foam + Visual | Total Mixture | Foam % of Avg | Mixture vs Avg |
|---|---|---|---|---|---|---|---|---|---|---|---|
| Visual Consistency | 4 | 4 | 4 | 4 | 4 | 20 | 0.8 | 127 | 61 | 0.98641 | 0.97211 |
| Texture (Smoothness) | 5 | 5 | 5 | 5 | 5 | 25 | 1 | | | | |
| Foam and Bubbles | 4 | 5 | 5 | 5 | 4 | 23 | 0.92 | | | | |
| Residue on Bottle Wall | 4 | | | | 4 | 8 | 0.8 | | | | |
| Layering | 4 | 4 | 4 | 4 | 4 | 20 | 0.8 | | | | |
| Bubble Size and Spread | 4 | 5 | 5 | 5 | 4 | 23 | 0.92 | | | | |
| Ease of Pouring | 5 | | | | 5 | 10 | 1 | | | | |
| Unmixed Residue | 4 | | | | 4 | 8 | 0.8 | | | | |
| Aroma | 5 | 4 | 5 | 5 | 5 | 24 | 0.96 | | | | |

FIG. 17

| Blender Trial 2 | Initial | Top | Middle | Bottom | 15 Mins | Total Row | Row Score % | Total Foam + Visual | Total Mixture | Foam % of Avg | Mixture vs Avg |
|---|---|---|---|---|---|---|---|---|---|---|---|
| Visual Consistency | 4 | 4 | 4 | 4 | 4 | 20 | 0.8 | 119 | 58 | 0.92427 | 0.9243 |
| Texture (Smoothness) | 4 | 4 | 4 | 4 | 4 | 20 | 0.8 | | | | |
| Foam and Bubbles | 4 | 4 | 4 | 4 | 4 | 20 | 0.8 | | | | |
| Residue on Bottle Wall | 5 | | | | 5 | 10 | 1 | | | | |
| Layering | 4 | 4 | 4 | 4 | 5 | 21 | 0.84 | | | | |
| Bubble Size and Spread | 4 | 4 | 4 | 4 | 4 | 20 | 0.8 | | | | |
| Ease of Pouring | 5 | | | | 5 | 10 | 1 | | | | |
| Unmixed Residue | 4 | | | | 4 | 8 | 0.8 | | | | |
| Aroma | 5 | 5 | 5 | 5 | 5 | 25 | 1 | | | | |

FIG. 18

| Shakesphere Trial 2 | Initial | Top | Middle | Bottom | 15 Mins | Total Row | Row Score % | Total Foam + Visual | Total Mixture | Foam % of Avg | Mixture vs Avg |
|---|---|---|---|---|---|---|---|---|---|---|---|
| Visual Consistency | 4 | 4 | 4 | 3 | 4 | 19 | 0.76 | 132 | 62 | 1.02524 | 0.98805 |
| Texture (Smoothness) | 5 | 5 | 5 | 5 | 5 | 25 | 1 | | | | |
| Foam and Bubbles | 5 | 5 | 5 | 5 | 5 | 25 | 1 | | | | |
| Residue on Bottle Wall | 4 | | | | 4 | 8 | 0.8 | | | | |
| Layering | 4 | 4 | 4 | 4 | 4 | 20 | 0.8 | | | | |
| Bubble Size and Spread | 5 | 5 | 5 | 5 | 5 | 25 | 1 | | | | |
| Ease of Pouring | 5 | | | | 5 | 10 | 1 | | | | |
| Unmixed Residue | 5 | | | | 5 | 10 | 1 | | | | |
| Aroma | 5 | 5 | 5 | 5 | 5 | 25 | 1 | | | | |

FIG. 19

| Averages Trial 2 | Initial | Top | Middle | Bottom | 15 Mins | Total Row | Row Score % | Total Foam + Visual | Total Mixture |
|---|---|---|---|---|---|---|---|---|---|
| Visual Consistency | 4.25 | 4.3 | 4.25 | 4 | 4.25 | 21 | 0.84 | 128.75 | 62.75 |
| Texture (Smoothness) | 4.75 | 4.8 | 4.75 | 4.75 | 4.75 | 23.75 | 0.95 | | |
| Foam and Bubbles | 4.25 | 4.8 | 4.6667 | 4.75 | 4.5 | 21.75 | 0.87 | | |
| Residue on Bottle Wall | 4.5 | | | | 4.5 | 9 | 0.9 | | |
| Layering | 4 | 4.3 | 4.25 | 4.25 | 4.5 | 21.25 | 0.85 | | |
| Bubble Size and Spread | 4.25 | 4.8 | 4.75 | 4.75 | 4.5 | 23 | 0.92 | | |
| Ease of Pouring | 5 | | | | 5 | 10 | 1 | | |
| Unmixed Residue | 4.5 | | | | 4.5 | 9 | 0.9 | | |
| Aroma | 5 | 4.8 | 5 | 5 | 5 | 24.75 | 0.99 | | |

FIG. 20

SAWTOOTH WAVE IMPELLER TUMBLER

TECHNICAL FIELD OF THE INVENTION

The present invention relates in general to fluid containers, and, more specifically, to a sawtooth wave impeller tumbler.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Mixing and blending are fundamental processes in a wide variety of industries, including food preparation, pharmaceuticals, chemicals, and construction. In these industries, efficient and consistent mixing of materials is critical to ensuring product quality, operational efficiency, and safety. Traditional mixing techniques often rely on mechanical mixers or manual processes, which can be time-consuming, labor-intensive, and prone to inconsistent results.

Mechanical mixers, while effective in certain applications, can suffer from limitations such as uneven distribution of ingredients, excessive heat generation, wear on components, and the need for frequent maintenance. Moreover, when mixing delicate or highly viscous materials, achieving the desired consistency without damaging the ingredients is a significant challenge.

In many cases, mixers rely on a rotating blade or impeller to create a vortex that combines materials. However, the mechanical force required to operate these mixers can introduce shear forces that degrade the quality of the materials being mixed. Furthermore, in some applications, such as the preparation of food or pharmaceutical products, hygiene and ease of cleaning are of paramount importance. Conventional mixers, particularly those with complex internal components or hard-to-reach areas, are difficult to clean thoroughly, which can lead to contamination risks.

Attempts to address these challenges have led to the development of various specialized mixing devices. For example, some advanced mixers employ vortex-based technology to create a more even distribution of ingredients, while others incorporate automated controls to optimize mixing speeds and times. However, these devices often suffer from their own drawbacks, such as high costs, complexity, or inefficiency in certain use cases.

Thus, there is a need in the art for a sawtooth wave impeller tumbler that may overcome the limitations of conventional mixers. An ideal solution would combine efficient mixing with ease of operation and cleaning, all while maintaining a high degree of precision and versatility in a wide range of applications. The device may comprise a pattern of internal sawtooth waves that provide for efficient and complete mixing of a solute and a solvent. In one embodiment the sawtooth wave impeller tumbler may comprise a tumbler for use by an individual user. The device may further comprise a plurality of components to improve the ease of use and the functionality of the device such as, for example, a handle, a carabiner clip, a mouth cap, a removeable lid, or a support base. It is to these ends that the present invention has been developed.

BRIEF SUMMARY OF THE INVENTION

To minimize the limitations in the prior art, and to minimize other limitations that will be apparent upon reading and understanding the present specification, the present invention describes a sawtooth wave impeller tumbler.

It is an objective of the present invention to provide a sawtooth wave impeller tumbler that may comprise a main body.

It is another objective of the present invention to provide a sawtooth wave impeller tumbler that may comprise an inner wall.

It is another objective of the present invention to provide a sawtooth wave impeller tumbler that may comprise an outer wall.

It is another objective of the present invention to provide a sawtooth wave impeller tumbler that may comprise a sawtooth wave concept.

It is another objective of the present invention to provide a sawtooth wave impeller tumbler that may comprise a half sinusoid component.

It is another objective of the present invention to provide a sawtooth wave impeller tumbler that may comprise a quarter circle component.

It is another objective of the present invention to provide a sawtooth wave impeller tumbler that may comprise a sharp edge component.

It is another objective of the present invention to provide a sawtooth wave impeller tumbler that may comprise a smooth curve component.

It is another objective of the present invention to provide a sawtooth wave impeller tumbler that may comprise a tumbler lid assembly.

It is another objective of the present invention to provide a sawtooth wave impeller tumbler that may comprise a lid body.

It is another objective of the present invention to provide a sawtooth wave impeller tumbler that may comprise a mouthpiece.

It is another objective of the present invention to provide a sawtooth wave impeller tumbler that may comprise a mouthpiece cover.

It is another objective of the present invention to provide a sawtooth wave impeller tumbler that may comprise an air vent.

It is another objective of the present invention to provide a sawtooth wave impeller tumbler that may comprise a handle.

It is another objective of the present invention to provide a sawtooth wave impeller tumbler that may comprise a lid attachment.

It is another objective of the present invention to provide a sawtooth wave impeller tumbler that may comprise a tumbler base.

It is another objective of the present invention to provide a sawtooth wave impeller tumbler that may comprise a tumbler base attachment.

It is another objective of the present invention to provide a sawtooth wave impeller tumbler that may comprise a resilient material of construction.

It is another objective of the present invention to provide a sawtooth wave impeller tumbler that may comprise a water-proof material of construction.

It is another objective of the present invention to provide a sawtooth wave impeller tumbler that may comprise a reusable material of construction.

It is another objective of the present invention to provide a sawtooth wave impeller tumbler that may comprise a washable material of construction.

It is another objective of the present invention to provide a sawtooth wave impeller tumbler that may comprise a multi-component construction.

It is another objective of the present invention to provide a sawtooth wave impeller tumbler that may comprise an antimicrobial layer.

It is another objective of the present invention to provide a sawtooth wave impeller tumbler that may comprise an antimicrobial material of construction.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 11 schematically presents an Impeller Trial 1 data and initial analysis, as contemplated by the present disclosure;

FIG. 12 schematically presents a Helimix Trial 1 data and initial analysis, as contemplated by the present disclosure;

FIG. 13 schematically presents a Blender Trial 1 data and initial analysis, as contemplated by the present disclosure;

FIG. 14 schematically presents a Shakesphere Trial 1 data and initial analysis, as contemplated by the present disclosure;

FIG. 15 schematically presents a plurality of averages from Trial 1 data and initial analysis, as contemplated by the present disclosure;

FIG. 16 schematically presents an Impeller Trial 2 data and initial analysis, as contemplated by the present disclosure;

FIG. 17 schematically presents a Helimix Trial 2 data and initial analysis, as contemplated by the present disclosure;

FIG. 18 schematically presents a Blender Trial 2 data and initial analysis, as contemplated by the present disclosure;

FIG. 19 schematically presents a Shakesphere Trial 2 data and initial analysis, as contemplated by the present disclosure;

FIG. 20 schematically presents a plurality of averages from Trial 2 data and initial analysis, as contemplated by the present disclosure;

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The sawtooth wave impeller tumbler may overcome the limitations of conventional mixers. An ideal solution would combine efficient mixing with ease of operation and cleaning, all while maintaining a high degree of precision and versatility in a wide range of applications. The device may comprise a pattern of internal sawtooth waves that provide for efficient and complete mixing of a solute and a solvent. In one embodiment the sawtooth wave impeller tumbler may comprise a tumbler for use by an individual user. The device may further comprise a plurality of components to improve the ease of use and the functionality of the device such as, for example, a handle, a carabiner clip, a mouth cap, a removeable lid, or a support base.

The illustrations of FIGS. 1-10 illustrate a sawtooth wave impeller tumbler, as contemplated by the present disclosure. The device may comprise, generally, a main body 100 having a sawtooth wave concept applied therein.

The main body 100 may comprise, generally, any appropriate fluid container such as, for example, a tumbler, a bottle, a jar, a barrel, a can, a tank, a jug, a vat, or any other container appropriate for containing fluids.

The sawtooth wave concept may comprise, generally, a plurality of parallel linear sawtooth waves oriented around an internal diameter of said main body 100.

The illustrations of FIGS. 1-10, and 23-24 illustrate a sawtooth wave impeller tumbler, as contemplated by the present disclosure. The device may comprise, generally, a main body 100 having a sawtooth wave concept applied therein.

The main body 100 may comprise, generally, any appropriate fluid container such as, for example, a tumbler, a bottle, a jar, a barrel, a can, a tank, a jug, a vat, or any other container appropriate for containing fluids.

The sawtooth wave concept may comprise, generally, a plurality of parallel linear sawtooth waves oriented around an internal diameter of said main body 100.

Figure 1:
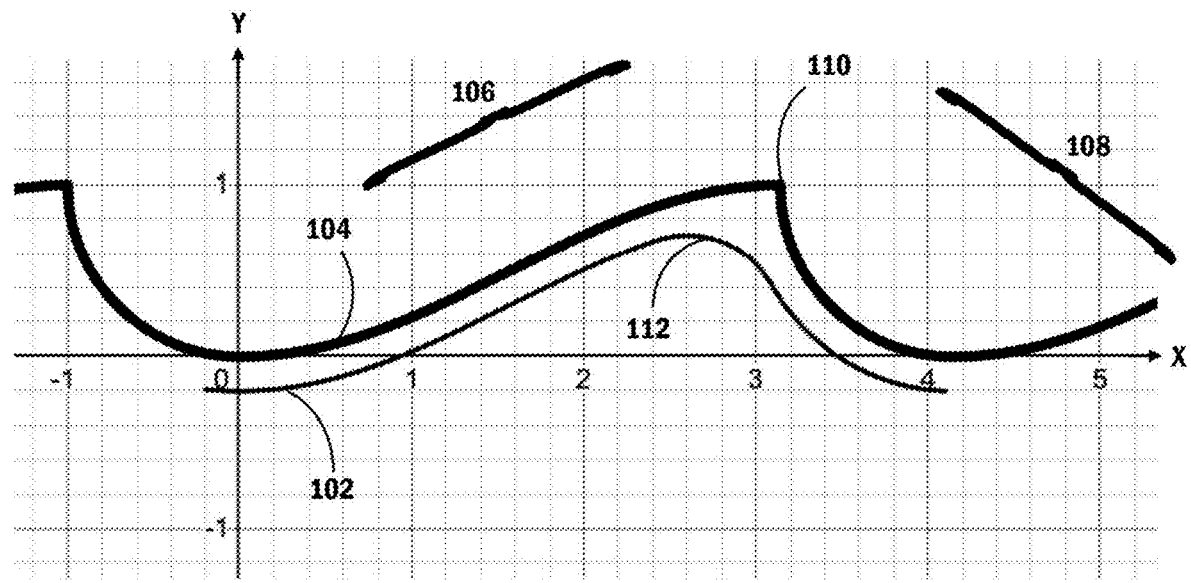
FIG. 1 schematically presents a sawtooth pattern cross-section of a sawtooth wave impeller tumbler, as contemplated by the present disclosure.
Figure 2:
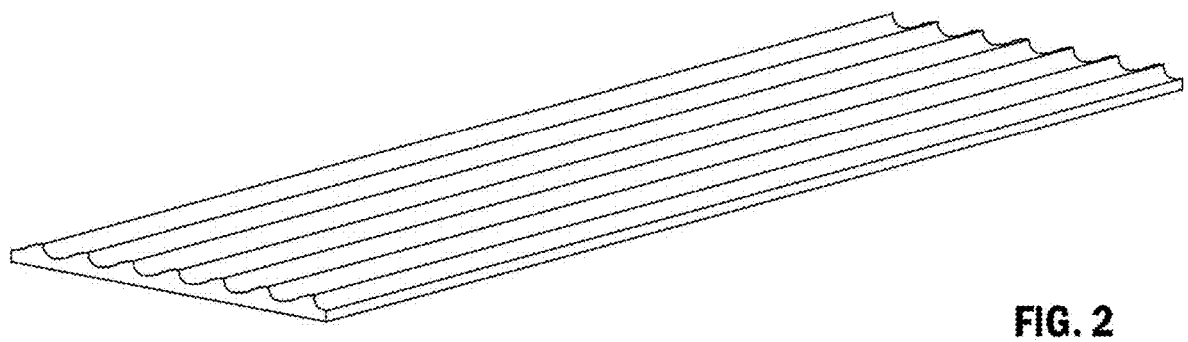
FIG. 2 schematically presents a sawtooth wave concept of a sawtooth wave impeller tumbler, as contemplated by the present disclosure.
Figure 3:
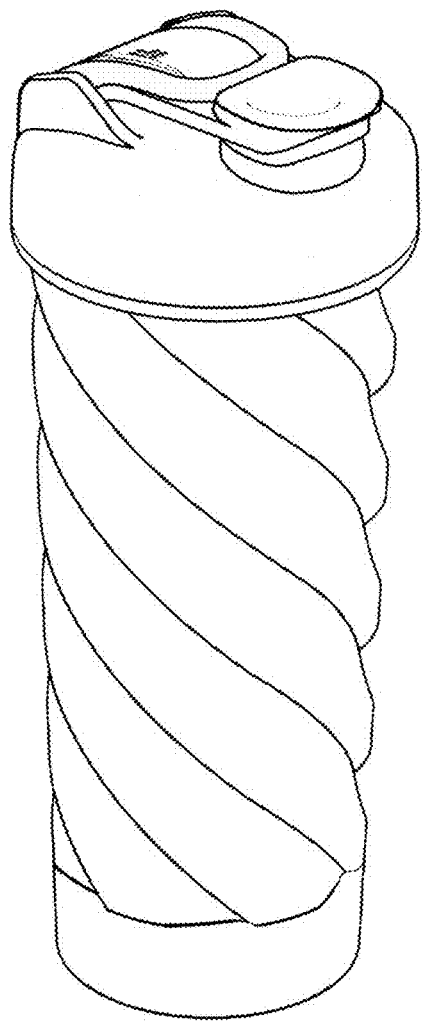
FIG. 3 is an isometric perspective view of a first embodiment of a sawtooth wave impeller tumbler in an assembled and closed configuration, as contemplated by the present disclosure.
Figure 4:
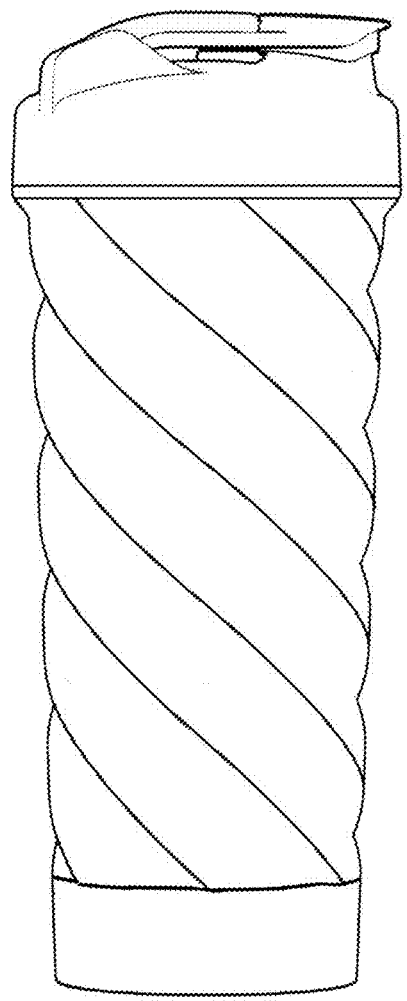
FIG. 4 is a left side elevation view of a first embodiment of a sawtooth wave impeller tumbler in an assembled and closed configuration, as contemplated by the present disclosure.
Figure 5:
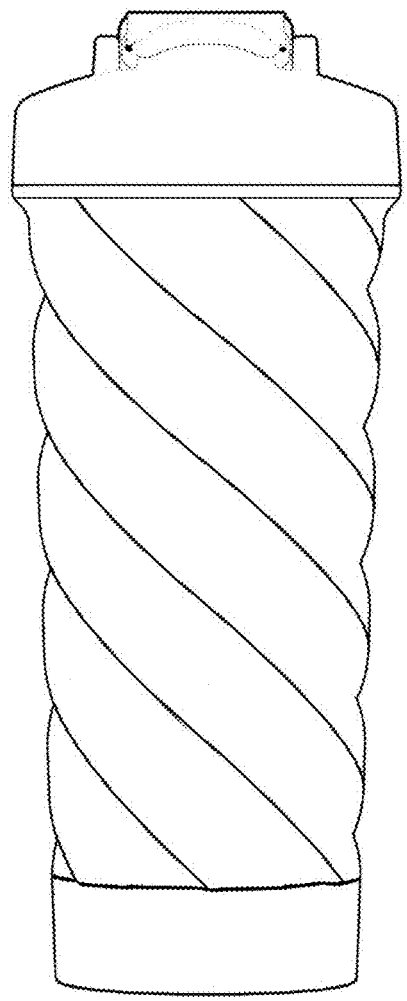
FIG. 5 is a front elevation view of a first embodiment of a sawtooth wave impeller tumbler in an assembled and closed configuration, as contemplated by the present disclosure.
Figure 6:
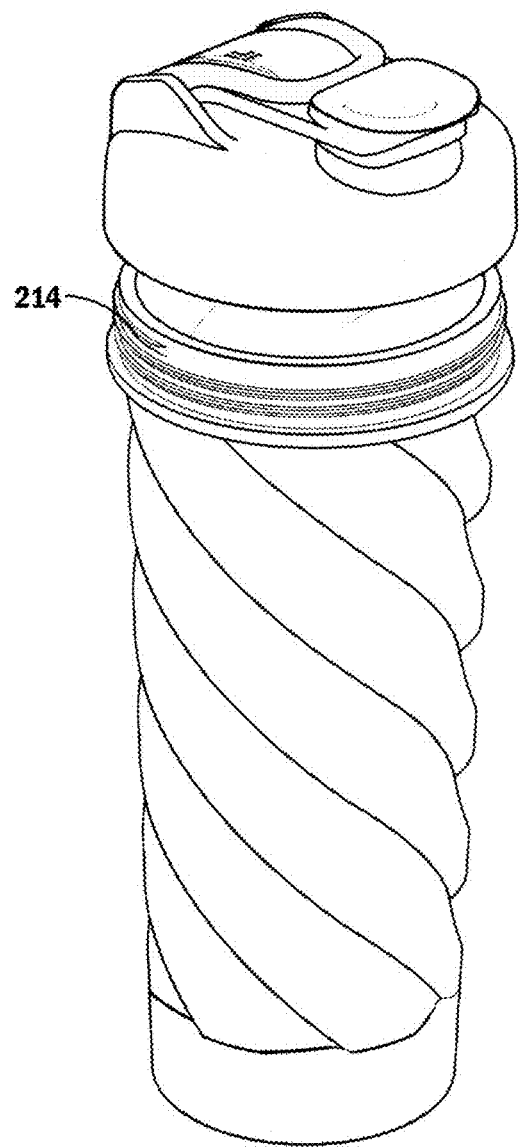
FIG. 6 is an isometric perspective view of a first embodiment of a sawtooth wave impeller tumbler showing a relative orientation between a main body and a tumbler lid assembly, as contemplated by the present disclosure.
Figure 7:
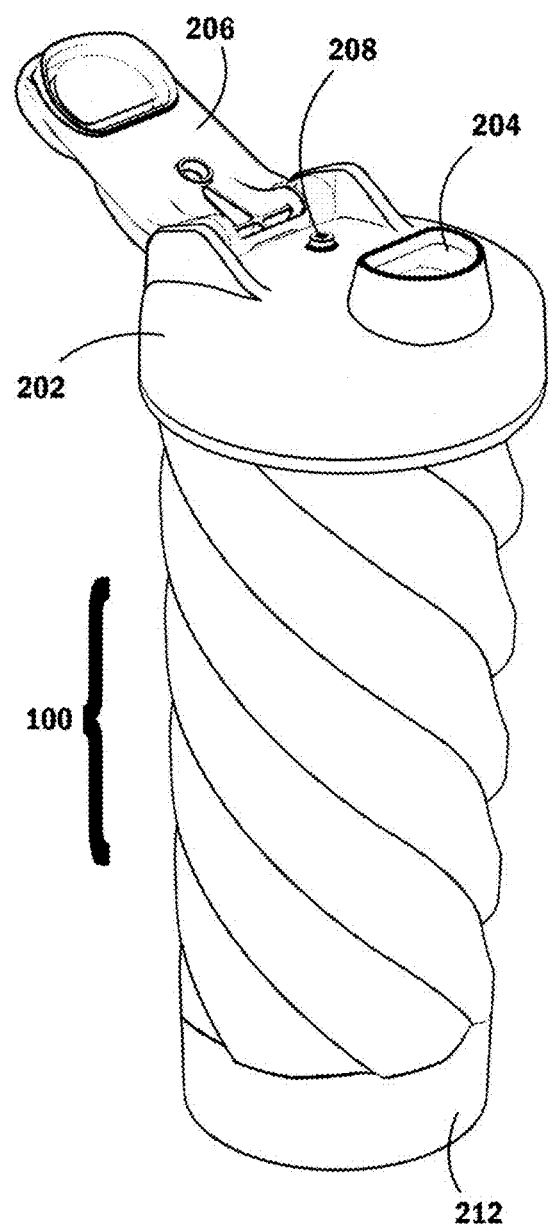
FIG. 7 is an isometric perspective view of a first embodiment of a sawtooth wave impeller tumbler showing an open mouthpiece cover, as contemplated by the present disclosure.
Figure 8:
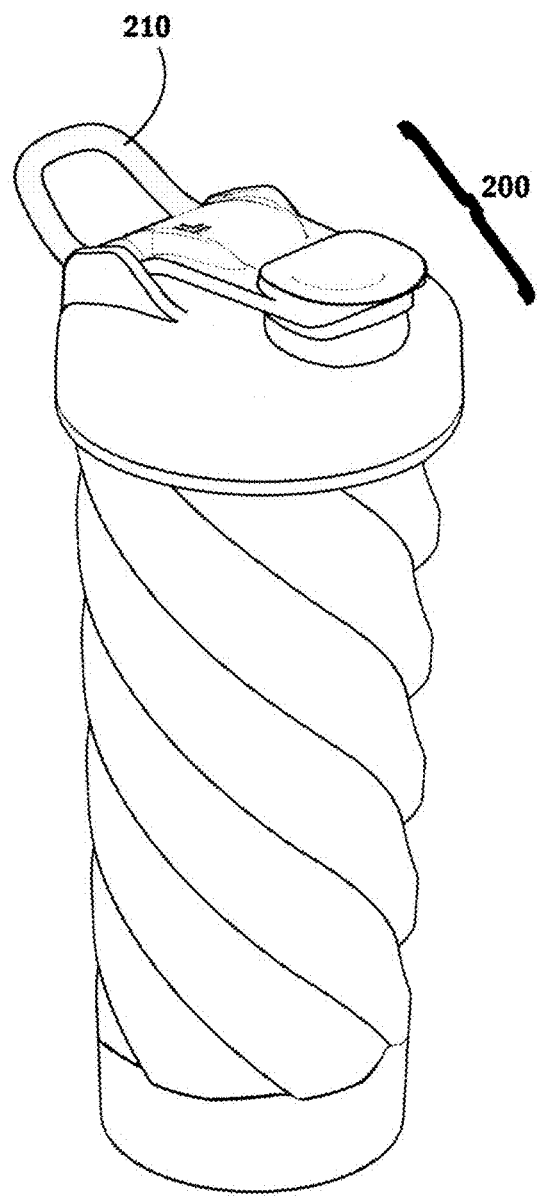
FIG. 8 is an isometric perspective view of a first embodiment of a sawtooth wave impeller tumbler showing an open handle, as contemplated by the present disclosure.
Figure 9:
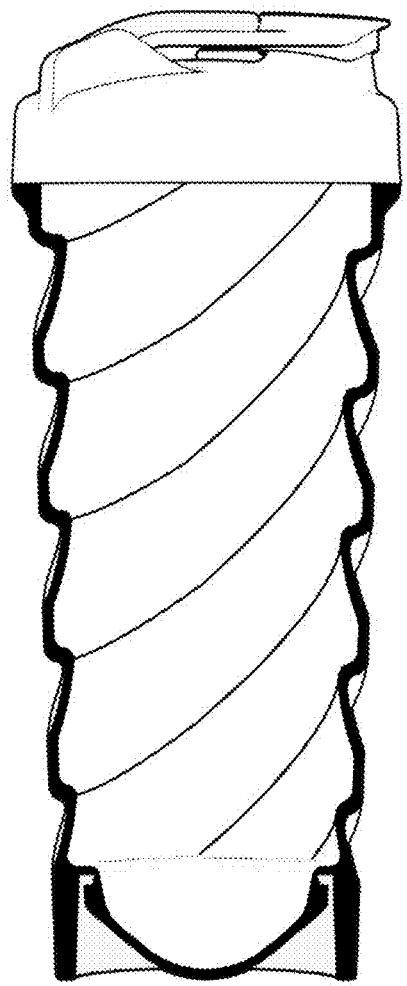
FIG. 9 is a cross-sectional view of a first embodiment of a sawtooth wave impeller tumbler showing an internal sawtooth wave concept, as contemplated by the present disclosure.
Figure 10:
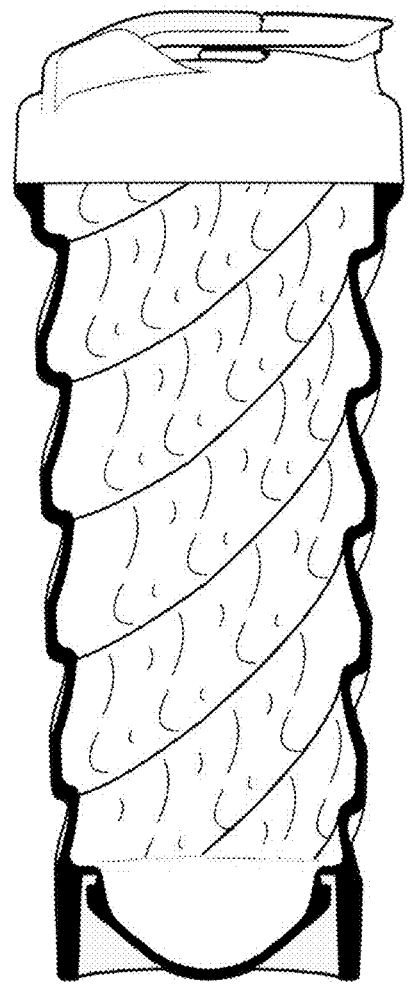
FIG. 10 is a cross-sectional view of a first embodiment of a sawtooth wave impeller tumbler showing an internal sawtooth wave concept with additional detail lines representing curvatures in said concept, as contemplated by the present disclosure.
Figure 21:
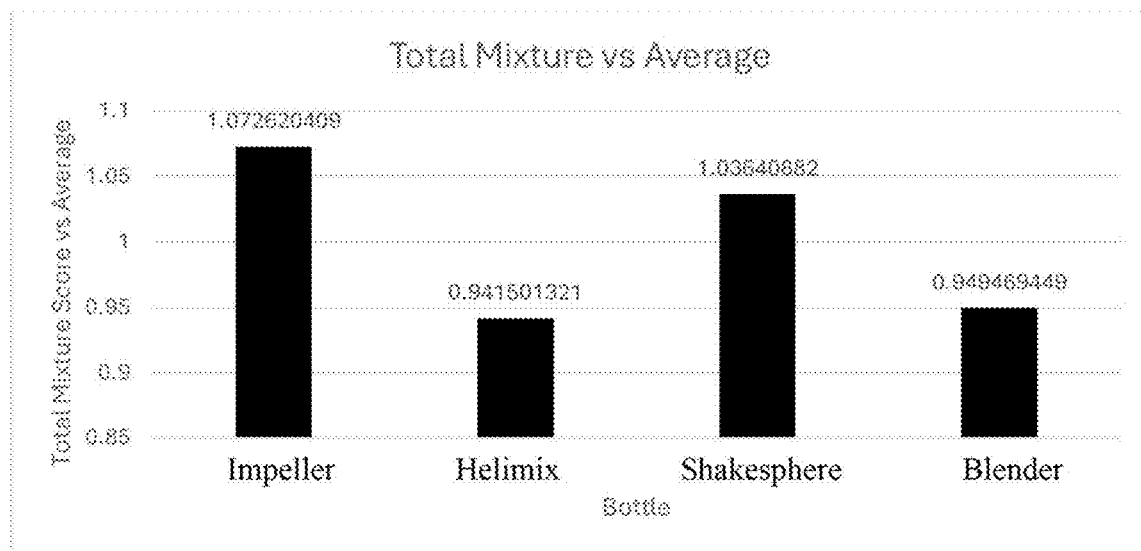
FIG. 21 schematically presents a Impeller Trial 1 data and initial analysis, as contemplated by the present disclosure.
Figure 22:
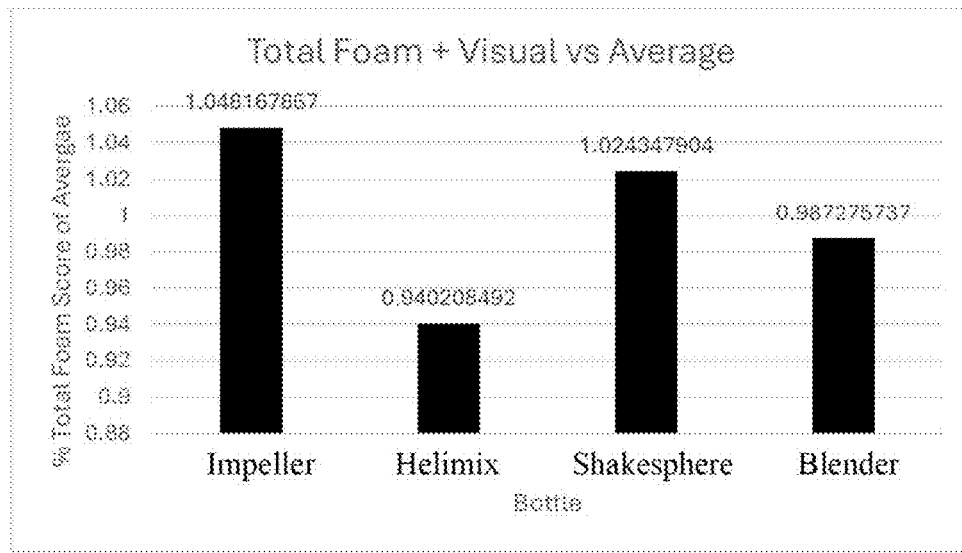
FIG. 22 schematically presents a Impeller Trial 1 data and initial analysis, as contemplated by the present disclosure.
Figure 23:
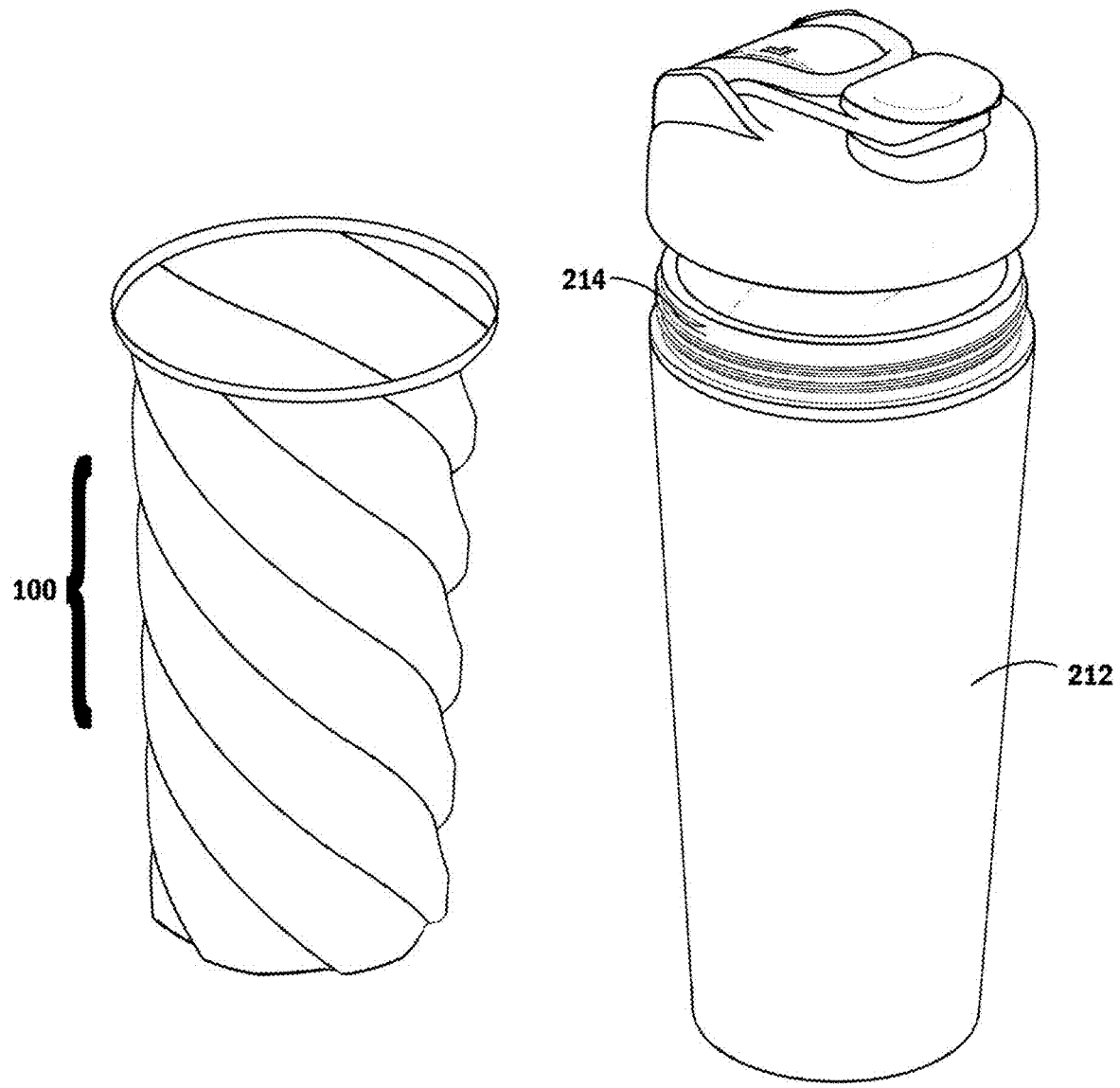
FIG. 23 is an exploded component view of a second embodiment of a sawtooth wave impeller tumbler, as contemplated by the present disclosure.
Figure 24:
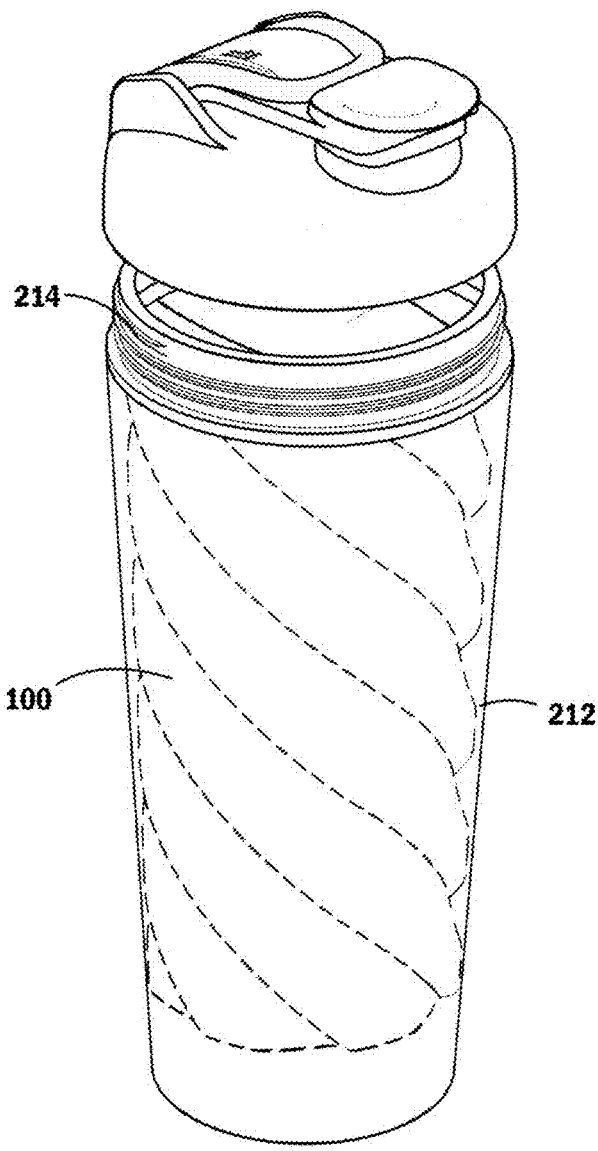
FIG. 24 is an isometric perspective view of a second embodiment of a sawtooth wave impeller tumbler showing a relative orientation between a main body, a tumbler lid assembly, and a tumbler base, as contemplated by the present disclosure.

Referring first to FIGS. 1 and 2, the sawtooth wave concept is considered advantageous over alternative concepts in the art as it has been demonstrated through evidence-based testing to provide enhanced mixing efficiency and maintenance characteristics over the prior art.

One underlying notion of the sawtooth wave is the idea that spiral ridges can generate vorticity in a fluid that is shaken in a vessel without the need for moving internal parts. A second underlying notion of the sawtooth wave is the idea that the flow pattern of a fluid at a higher Reynolds number (Re) tends to become more turbulent as a result of differences in the fluid's speed and direction, and this turbulence may be called eddy currents. Such eddy currents cause flow churn and cavitation, which may serve to increase the efficiency and completion of the mixing of a solute and a solvent.

To increase the Reynolds number in the vorticity of a fluid, it is theorized herein that a series of ridges which are sharper on one side than the other can induce an asymmetric trend in an oscillating fluid due to the non-linearity of the fluid dynamics over these ridges. Such ridges may comprise five essential design elements, namely: shape, angle, spacing, height, and sense.

To achieve the desired objective, the shape of the ridges must be asymmetric in that the shape on one side of the ridge must be sharper or steeper than the shape on the other side of the ridge. Any appropriate profile may be used to achieve such a difference such as, for example, a straight ramp and sudden drop, though additional factors may be considered to increase the efficiency of such a design. In one embodiment, the ridge shape may comprise a half sinusoid 106 shape combined with a quarter circle 108 shape, which may serve to improve or maximize mixing efficiency while allowing for ease of cleaning and maintenance. The combination of the half sinusoid 106 and the quarter circle 108 in the ridge shape allows for the creation of a sharp edge 110, which may provide additional increases in the desired characteristics.

The length of the ridge shape may also provide additional increases in the desired mixing efficiency. The proposed ridge profile may comprise an overall non-dimensional period of $\pi+1$ and an amplitude from base to peak of 1. The half sinusoid 106 may be defined as "$y=\frac{1}{2}(1-\cos x)$" for $0<x<\pi$, and the quarter circle 108 may be defined as "$y=1-\sqrt{(1-(x-\pi-1)^2)}$" for $\pi<x<\pi+1$.

The angle of the various ridges may refer to their orientation relative to the vertical parameter of the main body 100, and the use of any angle greater than zero degrees (0°) and less than ninety degrees (90°) relative to the vertical parameter may induce a vertical movement of the fluid when it is rotated within the main body 100. If the angle of the various ridges is defined as theta ($\Theta$), then the speed of incidence of the vertical flow against the ridges is proportional to the cosine of theta ($\cos \Theta$) and the azimuthal (or horizontal) component of the vertical flow is proportional to the sine of theta ($\sin \Theta$). The consequential eddy currents, and the resulting Reynolds number, based on a chosen angle, then, may be considered a product of "$\cos \Theta \sin \Theta$". This equation is equivalent to "$\frac{1}{2} \sin 2 \Theta$", which may have its maximum value when "$2\Theta=\pi/2$", or "$\Theta=\pi/4$". Such calculations suggest that an optimum angle for mixing efficiency is achieved as the angle of the various ridges approaches forty-five degrees (45°), though any appropriate angle may prove effective in combination with any appropriate shape.

The spacing of the spiral ridges may be proportional to the diameter of the main body 100 and may vary as appropriate to maintain the preferred overall length of the ridge shape as $\pi+1$. If this overall length is defined as lambda ($\lambda$) then the azimuthal spacing may be calculated as "$\lambda \csc \Theta$". If there are to be n spirals of the various ridges around a perimeter of "$2\pi r$", where r is the radius of the main body 100, then n may be an integer equal to "$2\pi(r/\lambda) \sin \Theta$". Assuming an n value of 4, 5, or 6 the "$\lambda/r$" value may be determined to be approximately 1.111, 0.889, and 0.740, respectively. At a $\Theta$ of 45°, then, it may be optimal for n to be five (5) or six (6), while a lower n may be appropriate for a lower $\Theta$ and a higher n may be appropriate for a higher $\Theta$.

The height of the ridge shape may be variable proportionally to the length of the ridge shape within the concept that the non-dimensional period is $\pi+1$ and the amplitude is 1. Thus, the overall height of the ridge shape may be optimal at approximately one-fourth (¼) of the overall length of the ridge shape. By way of example, if the diameter of the main body 100 is eight (8) centimeters (cm) then r is four (4) cm. If n is six (6) the $\lambda$ is calculated to be approximately three (3) cm and the height may be approximately seven and one-half (7.5) millimeters (mm).

The sense of the ridge shape may refer to the orientation of the ridge shape to the main body 100, namely, whether the sharp edge 100 is oriented towards an upper end of the main body 100 or a lower end of a main body 100. Each sense orientation of the ridge shape may provide its own advantages as it relates to maintenance and cleaning, and the preference for one orientation over the other may vary with the overall height and/or diameter of the main body 100.

In one embodiment the device may comprise, generally, a main body 100, a tumbler lid assembly 200, and a tumbler base 212.

The main body 100 may comprise a portable fluid container having an upper end and a lower end connected via a perimeter wall having an exterior wall 102 and an interior wall 104 separated by a thickness. The interior wall 104 may comprise a sawtooth wave concept. The exterior wall 102 may comprise any shape appropriate for allowing a user to hold the main body 100. By way of example, the main body 100 may comprise a tumbler having a smooth outer surface and a sawtooth wave inner surface.

The upper end of the main body 100 may further comprise a lid attachment 214, which may comprise any appropriate mechanism for attaching a lid to the main body 100 such as, for example, a screw attachment, a snap attachment, a slip-fit attachment, or any other appropriate mechanism.

The lower end of the main body 100 may further comprise a tumbler base 212, which may comprise any appropriate mechanism for supporting the main body 100 on a surface. In one embodiment the tumbler base 212 may be molded onto the lower end of the main body 100. In another embodiment the tumbler base 212 may be removably attached to the lower end of the main body 100.

The tumbler lid assembly 200 may comprise any appropriate lid suitable for covering the main body 100 to create an enclosed container. The tumbler lid assembly 200 may further comprise a lid body 202, a mouthpiece 204, a mouthpiece cover 206, an air vent 208, and a handle 210.

The lid body 202 may comprise any appropriate lid body suitable for attaching to and covering the main body 100 to create an enclosed fluid container. The mouthpiece 204 may comprise any appropriate opening through the lid body 202 to allow for the passage of fluid. The mouthpiece cover 206 may comprise any appropriate component for covering the mouthpiece 204 and preventing the passage of fluid therethrough. The air vent 208 may comprise any appropriate opening through the lid body 202 to allow for the passage of air. In one embodiment the mouthpiece cover 206 may simultaneously cover the mouthpiece 204 and the air vent 208 when in a closed orientation. The handle 210 may comprise any appropriate handle for allowing a user to carry or hang the device.

In another embodiment the device may comprise, generally, a main body 100, a tumbler lid assembly 200, and a tumbler base 212.

The main body 100 may comprise an insert having an upper end and a lower end connected via a perimeter wall having an exterior wall 102 and an interior wall 104 separated by a thickness. The interior wall 104 may comprise a sawtooth wave concept. The exterior wall 102 may comprise any shape appropriate for allowing the main body 100 to be inserted into a tumbler base 212.

The tumbler base 212 may comprise a housing appropriate for supporting the main body 100 on a surface. The tumbler base 212 may be designed to replicate any appropriate fluid container such as, for example, a tumbler, a bottle, a jar, a barrel, a can, a tank, a jug, a vat, or any other container appropriate for containing fluids.

The upper end of the tumbler base 212 may further comprise a lid attachment 214, which may comprise any appropriate mechanism for attaching a lid to the tumbler base 212 such as, for example, a screw attachment, a snap attachment, a slip-fit attachment, or any other appropriate mechanism.

The sawtooth wave impeller tumbler may be substantially assembled by any appropriate mechanism known in the art. By way of example, the various components of the device may be attached to one another, as contemplated by the present disclosure, by screwing, gluing, welding, adhering, interlocking, clasping, binding, nailing, or any other appropriate mechanism.

The sawtooth wave impeller tumbler may be substantially constructed of any suitable material or combination of materials, but typically is constructed of a resilient material or combination of materials such that the device is resistant to damage as a result of compression, twisting, heating, or submersion in water. As an example, and without limiting the scope of the present invention, various exemplary embodiments of the sawtooth wave impeller tumbler may be substantially constructed of one or more materials of steel, aluminum, brass, fiberglass, carbon fiber, plastic, acrylic, polycarbonate, polyester, nylon, denim, cotton, silicone, or combinations thereof. In some embodiments the various components of the device may be coated, lined, or otherwise insulated to prevent contamination of the device. In one embodiment the material of construction may vary from one component to the next within the system.

In one embodiment the sawtooth wave impeller tumbler may comprise a resilient material of construction that either comprises a material having antimicrobial properties or comprises a layering of antimicrobial material or coating. Antimicrobial properties comprise the characteristic of being antibacterial, biocidal, microbicidal, anti-fungal, anti-viral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

To demonstrate the advantages of the present design the following experiment has been conducted: an experiment designed to provide a comparative analysis of the mixing capabilities of four (4) different protein shaker bottles. The bottles are designed to utilize water or other liquids to mix commercially manufactured protein powder into a homogeneous mixture. The initial results from this experiment provide clear inferences of overall mixing capabilities between the bottles, with the sawtooth wave impeller bottle providing the best overall scores compared between the 4 bottles tested within the scope of this experiment. The initial evidence provides results that can be measured comparatively to provide overall mixing scores in various comparative means to evaluate the protein mixing capabilities of the 4 bottles within this study.

The first of the tested bottles is the sawtooth wave impeller bottle as described herein. The second of the tested bottles may be known in the public domain as the "Heli-mix", which integrates a helical shape in the bottle design to simulate a vortex during shaking. The third of the tested bottles is the classic blender bottle, which utilizes a whisk ball that moves freely within the bottle to break down clumps in the liquid. The fourth of the tested bottles may be known in the public domain as the "ShakeSphere", which integrates a spherical design without mixing components that relies on a smooth interior surface and specific shaking motions to encourage mixing.

The objective of the experiment is to (1) quantify and compare the mixing efficiency of the sawtooth wave impeller bottle relative to three competitive bottles, (2) establish standardized criteria for evaluating mixing efficiency based on visual assessment, smoothness, and homogeneity, and (3) validate the design principles of the sawtooth wave impeller bottle through a repeatable, controlled testing process to determine if the unique ridge structure and placement offer significant advantages in protein mixing.

To accurately compare the mixing performance of the 4 bottles, several factors are standardized and monitored to ensure reliable, repeatable results. The first of these standardized factors relates to the shaking technique. Each bottle should be mixed for the same fixed shaking duration, which is set to thirty (30) seconds for the purpose of this experiment. Each bottle should be mixed using the same shaking amplitude, which is set to eighteen (18) inches for the purpose of this experiment. Each bottle should be mixed using the same shaking frequency, which is set to three (3) shakes per second for the purpose of this experiment. Each bottle should be mixed using the same shaking pattern, which is set to an up-and-down motion for the purpose of this experiment.

The second of these standardized factors relates to the type of protein mix and water used in the shaking procedure. The protein type used should be consistent between the four bottles, though no particular protein mix is considered advantageous over another. For the purpose of this experiment a consistent quantity of protein powder from the same batch was utilized to prevent inconsistencies that may occur between batches and brands. The water volume should also be consistent between the four bottles, of which four hundred (400) milliliters was used to mix two (2) standardized scoops of protein powder. The water temperature should also be consistent between the four bottles, and a temperature of twenty (20) degrees Celsius was used for the purpose of this experiment. The water type should also be consistent between the four bottles, though no particular water type is considered advantageous over another. For the purpose of this experiment water from a single public source, such as tap water, is utilized to prevent inconsistencies that may occur between water from different sources.

Immediately after mixing, the trials were observed and recorded for the visual appearance of the mixture, focusing on the presence of bubbles, unmixed clumps, and general smoothness. A standardized scoring system was used, which is outlined in detail below. Each mixture was poured through a fine mesh strainer to capture any unmixed protein clumps. Photographs were captured after the resultant trials for each bottle. Samples were collected from the top, middle, and bottom of each mixture to assess homogeneity. This step can reveal sedimentation issues where protein powder settles unevenly, affecting the consistency. The presence of excess foam was documented, which may indicate inefficient mixing. Texture analysis, such as smoothness vs. grittiness, can be conducted by a small panel of evaluators using a standard descriptive scale.

To objectively assess the performance of each bottle, a structured framework for evaluating the physical and visual properties of the protein mixtures is utilized. These criteria represent standard benchmarks for determining "good" versus "poor" mixing quality, based on attributes such as smoothness, uniformity, foam presence, and clumping. Each property is evaluated using a qualitative and quantitative approach, ensuring that each mixture's characteristics are consistently reviewed across trials. This guideline helps analysts in identifying and quantifying any issues with incomplete mixing and allows a thorough, comparable assessment of each bottle's effectiveness.

Visual consistency is observed immediately after mixing to note for the presence and extent of clumping or layering in the mixture. Texture is assessed by sampling from the top, middle, and bottom of each mixture to determine homogeneity or variations in texture within each mixture. Foam and bubbles were observed for within each mixture, and the amount and height of foam was compared along with the persistence of such foam. Residue remaining on the internal walls of each bottle was also observed, noting that the evidence of residual protein mix on the walls of a bottle indicates a poor mixing characteristic. Separation of layers is also observed to determine whether the mixture is consistent throughout. Bubble size and spread were observed immediately after mixing and five (5) minutes after mixing to determine the, noting that small, quickly dissolving bubbles indicate a good mixing characteristic. Ease of pouring through a mesh strainer was also observed to analyze mixing efficiency. Any amount of unmixed residue captured on a mesh strainer was also observed, noting that increased residue indicates a poor micing characteristic. The aroma of the mixture was also observed to determine if any remaining protein scent remained after mixing.

The illustrations of FIGS. 11-21 illustrate a plurality of trial scores and data acquired via the above-described experiment. These scores were reviewed for both the total row score, as well as the row score percentage. The total foam+visual score is a combination of the total row scores from row 1, 2, 3, 4, 5, 6, and 8. This score reviews the overall foam and mixing capabilities and provides a clearer view of the performance of each bottle.

Another separate score tabulated was the total mixture score, which is a combination of rows 1, 2, 4, and 8. This score provides a more distinguishable representation of the actual mixing factors, not counting foam creation or foam dispersion, as these factors are more related to the insertion of excess air during mixing though not attributed to actual mixing capability. Using this data we can provide both empirical and statistical analysis for each of the bottles' performance to provide a clear picture of which bottle has the best overall performance in this experiment.

Through the experimentation and data collection there are several conclusions that we can devise from this experimental report. Based on the data collected, it appears that through the 2 trials the best overall performing bottle was the Impeller bottle with the highest overall scores from the data reviewed in this report. The second and very close runner-up would be the Shakesphere bottle, which showed similar but slightly lower overall results, but was above average compared to the other 2 bottles reviewed. The Blender bottle was the third in the data scores overall, with good results but below average in comparison, while the lowest performing bottle was the Helimix. Based on the data collected, the empirical evidence from the experiment and the analysis done in the report, we can infer that the Impeller bottle provided the highest scores in terms of overall mixing capabilities, with close but lower values seen in the Shakesphere bottle.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

We claim:

1. A sawtooth wave impeller tumbler, comprising:
   a main body; and
   a sawtooth wave;
   wherein said main body comprises a fluid container;
   wherein said sawtooth wave comprises a shape, an angle, a spacing, a height, and a sense;
   wherein said sawtooth wave defines an interior wall of said main body;
   wherein said shape of said sawtooth wave comprises a ridge having a first side, a sharp edge, a second side, and a length;
   wherein said first side of said shape and said second side of said shape are asymmetrical;
   wherein said angle of said sawtooth wave is a non-zero angle relative to said main body;
   wherein said spacing of said sawtooth wave is proportional to a diameter of said main body; and wherein said height of said sawtooth wave is proportional to said length of said ridge.

2. The sawtooth wave impeller tumbler of claim 1,
wherein said first side of said shape comprises a half sinusoid; and
wherein said second side of said shape comprises a quarter circle.

3. The sawtooth wave impeller tumbler of claim 2, further comprising:
a tumbler lid assembly;
wherein said tumbler lid assembly is removably attached to an upper end of said main body.

4. The sawtooth wave impeller tumbler of claim 3,
wherein said tumbler lid assembly further comprises a mouthpiece, a mouthpiece cover, an air vent, and a handle.

5. The sawtooth wave impeller tumbler of claim 4, further comprising:
a tumbler base;
wherein said tumbler base is removably attached to a lower end of said main body.

6. A sawtooth wave impeller tumbler, comprising:
a main body; and
a sawtooth wave;
wherein said main body comprises an insert;
wherein said sawtooth wave comprises a shape, an angle, a spacing, a height, and a sense;
wherein said sawtooth wave defines an interior wall of said main body;
wherein said shape of said sawtooth wave comprises a ridge having a first side, a sharp edge, a second side, and a length;
wherein said first side of said shape and said second side of said shape are asymmetrical;
wherein said angle of said sawtooth wave is a non-zero angle relative to said main body;
wherein said spacing of said sawtooth wave is proportional to a diameter of said main body; and
wherein said height of said sawtooth wave is proportional to said length of said ridge.

7. The sawtooth wave impeller tumbler of claim 6,
wherein said first side of said shape comprises a half sinusoid; and
wherein said second side of said shape comprises a quarter circle.

8. The sawtooth wave impeller tumbler of claim 7, further comprising:
a tumbler lid assembly; and
a tumbler base;
wherein said main body is removably inserted into said tumbler base; and
wherein said tumbler lid assembly is removably attached to an upper end of said tumbler base.

9. The sawtooth wave impeller tumbler of claim 8,
wherein said tumbler lid assembly further comprises a mouthpiece, a mouthpiece cover, an air vent, and a handle.

* * * * *